(12) United States Patent
Barnsley

(10) Patent No.: US 9,183,642 B2
(45) Date of Patent: Nov. 10, 2015

(54) GRAPHICAL DATA PROCESSING

(75) Inventor: Jeremy D Barnsley, London (GB)

(73) Assignee: British Telecommunications PLC, London (GB)

( * ) Notice: Subject to any disclaimer, the term of this patent is extended or adjusted under 35 U.S.C. 154(b) by 184 days.

(21) Appl. No.: 13/522,887

(22) PCT Filed: Dec. 16, 2010

(86) PCT No.: PCT/GB2010/002283
§ 371 (c)(1),
(2), (4) Date: Jul. 18, 2012

(87) PCT Pub. No.: WO2011/086338
PCT Pub. Date: Jul. 21, 2011

(65) Prior Publication Data
US 2012/0293509 A1    Nov. 22, 2012

(30) Foreign Application Priority Data

Jan. 18, 2010 (GB) .................................. 1000738.3

(51) Int. Cl.
*G06K 9/36* (2006.01)
*G06K 9/46* (2006.01)
(Continued)

(52) U.S. Cl.
CPC ................ *G06T 9/00* (2013.01); *H04N 19/124* (2014.11); *H04N 19/136* (2014.11); *H04N 19/154* (2014.11); *H04N 19/172* (2014.11); *H04N 19/60* (2014.11); *H04N 19/63* (2014.11)

(58) Field of Classification Search
CPC ...... G06T 9/005; H04N 7/50; H04N 7/26111; H04N 7/26643; H04N 7/26106
USPC .......... 345/419; 382/166, 232, 233, 235, 243, 382/244
See application file for complete search history.

(56) References Cited

U.S. PATENT DOCUMENTS 5,819,048 A   10/1998  Okazaki et al.
6,046,709 A    4/2000  Shelton et al.
(Continued)

FOREIGN PATENT DOCUMENTS

EP    1 775 935 A2   4/2007
EP    2 020 799 A1   2/2009
(Continued)

OTHER PUBLICATIONS

JPEG-encoding.pdf Author: Wikipedia Date: Jan. 15, 2010 p. 4 Encoding.*
(Continued)

*Primary Examiner* — Phi Hoang
*Assistant Examiner* — Yi Yang
(74) *Attorney, Agent, or Firm* — Nixon & Vanderhye PC

(57) ABSTRACT

A method of controlling graphical data compression levels for a series of images of varying area in order to maintain a consistent image quality, irrespective of image area. An image of a first area is compressed using a first compression value. When the first image is decompressed for display, it is associated with a first image quality. When a new image with a different area is generated, it is compressed using a new compression value derived from the first compression value. The new compression value is suitable for delivering an image quality, when the new image is decompressed for display, substantially the same as the image quality of the first image.

10 Claims, 6 Drawing Sheets

(51) Int. Cl.
*G06T 9/00* (2006.01)
*H04N 19/172* (2014.01)
*H04N 19/60* (2014.01)
*H04N 19/124* (2014.01)
*H04N 19/136* (2014.01)
*H04N 19/154* (2014.01)
*H04N 19/63* (2014.01)

(56) References Cited

U.S. PATENT DOCUMENTS

| | | | |
|---|---|---|---|
| RE36,761 | E | 7/2000 | Fujiwara |
| 7,002,564 | B1 | 2/2006 | Greenberg |
| 7,881,544 | B2 * | 2/2011 | Bashyam et al. ............. 382/232 |
| 2002/0097918 | A1 | 7/2002 | Yokose |
| 2002/0109780 | A1 * | 8/2002 | Kaku ...................... 348/231.99 |
| 2002/0150123 | A1 | 10/2002 | Ro |
| 2004/0189677 | A1 | 9/2004 | Amann et al. |
| 2004/0267952 | A1 | 12/2004 | He et al. |
| 2005/0201414 | A1 | 9/2005 | Awais |
| 2005/0226325 | A1 * | 10/2005 | Dei et al. ................. 375/240.12 |
| 2006/0168338 | A1 | 7/2006 | Bruegl et al. |
| 2007/0003211 | A1 | 1/2007 | Gregory |
| 2007/0094723 | A1 | 4/2007 | Short et al. |
| 2007/0139427 | A1 | 6/2007 | Sahashi |
| 2007/0153825 | A1 | 7/2007 | Cho et al. |
| 2007/0206018 | A1 | 9/2007 | Bajic et al. |
| 2007/0223574 | A1 | 9/2007 | Roman et al. |
| 2007/0280255 | A1 | 12/2007 | Tsang et al. |
| 2008/0120424 | A1 | 5/2008 | Deshpande |
| 2008/0145078 | A1 * | 6/2008 | Tomita et al. ................... 399/60 |
| 2008/0273113 | A1 | 11/2008 | Hayon et al. |
| 2009/0216897 | A1 | 8/2009 | Wang |
| 2009/0274379 | A1 | 11/2009 | Lock et al. |
| 2009/0309885 | A1 | 12/2009 | Samson et al. |
| 2010/0063992 | A1 | 3/2010 | Ma et al. |
| 2010/0150529 | A1 * | 6/2010 | Leichsenring et al. ......... 386/95 |

FOREIGN PATENT DOCUMENTS

| | | |
|---|---|---|
| EP | 2 098 994 | 9/2009 |
| WO | 96/19080 | 6/1996 |
| WO | 03/049373 | 6/2003 |
| WO | 2009/098436 | 8/2009 |

OTHER PUBLICATIONS

International Search Report for PCT/GB2010/002283, mailed May 23, 2011.

Sullivan, B.J. et al., "Effects of Image Preprocessing/Resizing on Diagnostic Quality of Compressed Medical Images Chest Radiographs Application", Proceedings of the International Conference on Image Processing, vol. 2, (Oct. 23, 1995), pp. 13-16.

Poliakov, A.V. et al., "Server-based Approach to Web Visualization of Integrated 3-D Medical Image Data", Internet Citation, http://sigpubs.biostr.washington.edu/archive/00000080/, (2001).

Poliakov, Andrew V. et al., "Server-based Approach to Web Visualization of Integrated 3-D Medical Image Data", Structural Informatics Group, Department of Biological Structure, University of Washington, Seattle, Washington, Proc AMIA Symp., 2001: 533-537 (5 pgs.).

Sullivan, Barry J. et al., "Effects of Image Preprocessing/Resizing on Diagnostic Quality of compressed Medical Images", Image Processing, 1995. Proceedings., International Conference on, Oct. 23-26, 1995, vol. 2, pp. 13-16.

International Preliminary Report on Patentability for PCT/GB2010/002283 mailed Jul. 24, 2012 and Written Opinion.

Search Report (1 pg.) dated Apr. 14, 2010 issue for GB Application No. GB0921831.4.

Search Report (1 pg.) dated Mar. 9, 2010 issue for GB Application No. GB0921831.4.

Extract from "Handbook of Image and Video Processing"; section 8.2, "Perceptual Criteria for Image Quality Evaluation" by Thrasyvoulos N. Pappas and Robert J. Safranek; pp. 669-673; 2000 by Academic Press (7 pgs.).

* cited by examiner

Figure 5

Scaling factor of 0.7

| Step | Image Size | Resulting value of cv | |
|---|---|---|---|
| 1 | 1920 x 1200 | 50.00 | — 51 |
| 2 | 1000 x 800 | 23.84 | — 52 |
| 3 | 1920 x 1200 | 50.00 | — 53 |
| 4 | 2000 x 2000 | 73.57 | — 54 |
| 5 | 1800 x 1500 | 55.87 | — 55 |
| 6 | 1920 x 1200 | 50 | — 56 |

GRAPHICAL DATA PROCESSING

This application is the U.S. national phase of International Application No. PCT/GB2010/002283, filed 16 Dec. 2010, which designated the U.S. and claims priority to GB Application No. 1000738.3, filed 18 Jan. 2010, the entire contents of each of which are hereby incorporated by reference.

TECHNICAL FIELD

This invention in certain example embodiments relates to a method and system for processing graphical data with application to controlling graphical data compression.

BACKGROUND AND SUMMARY

Some graphical applications (or their underlying network protocols) make use of a client-server architecture whereby graphical data, comprising a series of frames each representing an image, are rendered (i.e. generated) on a server computer but transported over a network for display on a remote client computer. One example of the server-client model occurs in the display of two-dimensional (2D) images derived from a three-dimension (3D) model, such as a 3D visualisation of seismic and other geophysical data. Such 3D visualisations generate huge datasets which are difficult to distribute in an efficient manner, particularly over data networks. To address this difficulty, 2D images are rendered from the 3D visualisation at the server for distribution to one or more remote clients where the 2D images can be viewed Due to bandwidth limitations, most systems employ some form of image compression in order to significantly reduce the amount of data that needs to be sent to the client for display of the image. Image compression may be lossless (where there are no visible changes between the uncompressed image and the original) or lossy (where there are visible changes between the uncompressed image and the original).

For lossy compression, the user may want to retain a similar degree of image quality for different sizes of image. For some compression schemes this is achieved by setting a threshold value causing all images regardless of size to be compressed to a similar level of detail. However, many compression schemes are not able to use a threshold value. Furthermore, many systems only provide control of the size of the resulting compressed image rather than the image quality.

It is therefore desirable to provide a method and system for determining image compression values appropriate to achieving consistent image quality for images of different sizes.

According to certain example embodiments, there is provided a method of controlling graphical data compression levels for a series of images of varying area in order to maintain a consistent image quality, irrespective of image area. An image of a first area is compressed using a first compression value. When the first image is decompressed for display, it is associated with a first image quality.

When a new image with a different area is generated, it is compressed using a new compression value derived from the first compression value. The new compression value is suitable for delivering an image quality, when the new image is decompressed for display, substantially the same as the image quality of the first image.

An image processing system comprises an image processor configured in use to provide: (a) a rendering engine for rendering a series of images each with a respective image area; (b) a compression value generator for calculating for each image of the series starting from the second image of the series a compression value for compressing the respective image, in which each compression value is calculated from the ratio of the area of the image to the area of the previous image in the series and the compression value for the previous image in the series; (c) an encoder for compressing the series of images using the respective calculated compression values to produces a corresponding series of compressed images for decompression for display with a substantially constant image quality level.

BRIEF DESCRIPTION OF THE DRAWINGS

Certain example embodiments of the invention will now be described, by way of example, with reference to the accompanying drawings in which:

FIG. 5 shows a table of values calculated according to certain example embodiments of the invention.

DETAILED DESCRIPTION

Figure 1:
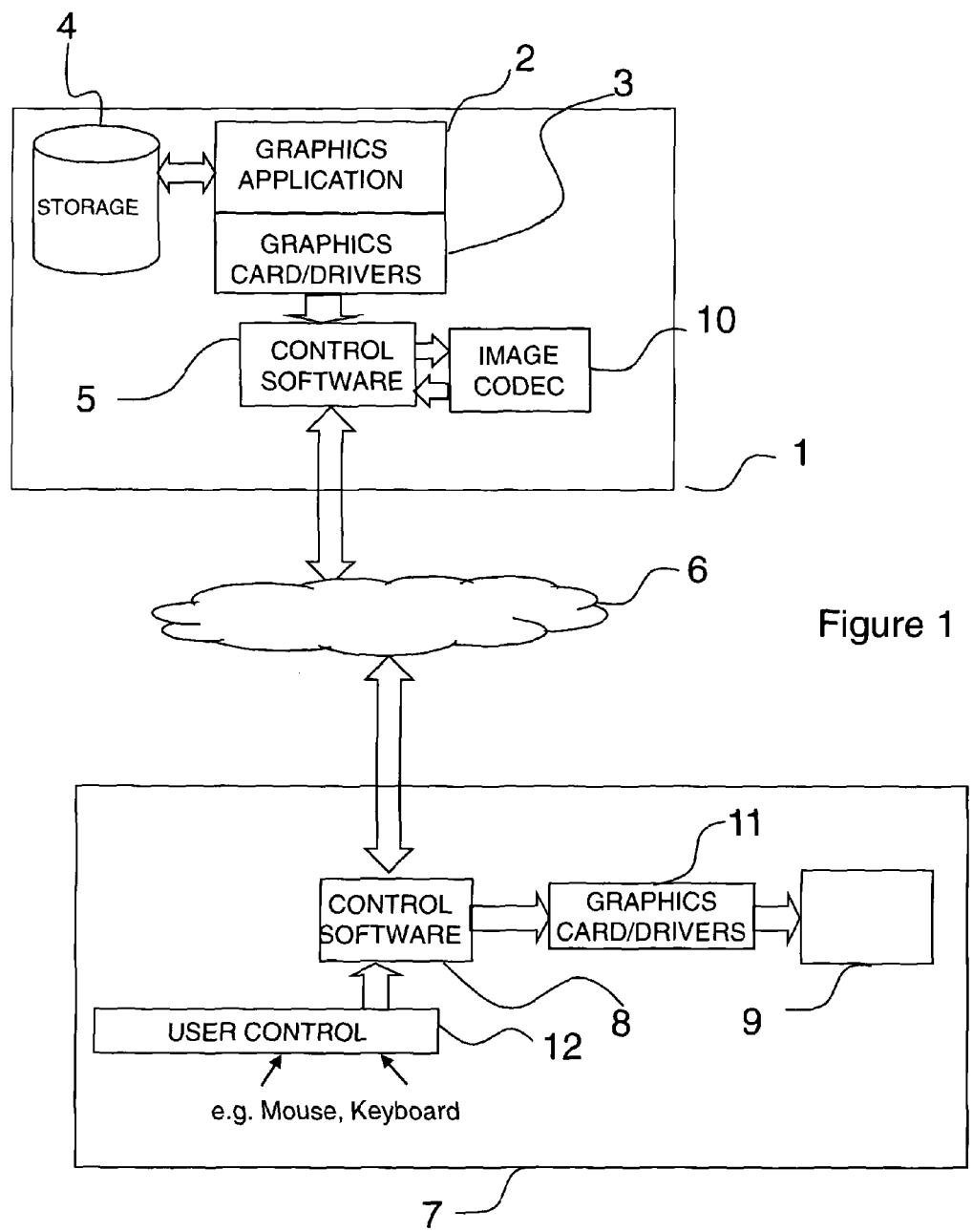
FIG. 1 is a block diagram of a system according to certain example embodiments of the invention.

The invention in certain example embodiments provides method of controlling graphical data compression levels for a series of images in order to retain a desired image quality regardless of the size (e.g. as measured in picture elements or pixels) of the rendered images. For example, a rendered image (which we shall refer to as being of "original size") is compressed for transmission according to a compression value. The compression value is associated with a specific image quality. The quality of the image when decompressed and displayed will be determined by a combination of the quality of the original rendered 2D image generated from the model and the degree of compression applied to the image. When a new image at a different size to a previous image is requested by the user, the new image is rendered from the model and a new compression value is derived for the new image based on the compression value used to compress the previous image. In this way, an image quality is achieved, when the new image is decompressed and displayed, that is consistent with the image quality of the previous, decompressed and displayed image.

Each image can be thought of as a separate frame in a series of images, each frame individually rendered based on parameters of size and scene contents. Note that it is the area of the image that determines the appropriate compression value. The area of the image will normally be slightly smaller than the area of the corresponding window which typically comprises both the image and a border around the image (for example see borders 42 and 44 in FIGS. 4a and 4b). Typically, the user changes the image size by manipulating the corresponding window. For example, modelling software is requested to create a model of a 3D red cube at 100×100 tilted on its axis, as shown at 30 in FIG. 3a. From cube model 30, a first 2D image of say 100×50 is generated for display, as shown at 32 in FIG. 3b, set in a window 34. A second, larger 2D image of model cube 30 is then rendered. To invoke this larger 2D image, the user resizes window 34 to create larger window 36, as shown in FIG. 3c. The same view of model cube 30 cube is rendered with colours, angles, etc kept constant but at a size to fit new window 36. New image 38 is rendered at a size of 300×200, for display, as shown in FIG. 3c.

Where an image is repeatedly rendered at different sizes to produce a series of images of varying sizes (for example, in response to commands received from a user viewing the images on a display) a compression value is provided appropriate to the size of each newly rendered image of the series. The same is true for a series of different images of varying sizes, i.e. a compression value is provided appropriate to the size of each newly rendered image of the series. That is, if an image is rendered at a size of 110×100 with an arbitrary compression value of, say, 23, when the corresponding window is enlarged and a new image is subsequently rendered at a size of 190×127 a new compression value of, say, 29 is calculated according to the method described here. When a subsequent image is rendered at a size of 110×100 (which is the size of a previous image in the series) recalculation of the compression value using the same technique produces the previous compression value of 23. Rather than storing and reloading the previous compression value used for that size of image, a new value is calculated for each new image size. Apart from the compression value used to compress the immediately previous image in the series, and the size of that image, earlier values do not need to be kept. The method described here provides for consistent recalculation of the appropriate compression value for any feasible image size.

A graphical data processing system according to a first embodiment of the invention will now be described in detail.

FIG. 1 shows a computer apparatus 1 such as a workstation or server for rendering and sending via network 6 a sequence of frames of graphical data representing images for display at remote client 7 according to a first embodiment of the invention. Server 1 comprises a general purpose computer with a processor (not shown) arranged to execute program code, which comprises graphics application program 2 and application-end control software 5, stored in local memory (typically semiconductor memory, not shown) to perform rendering and despatch of images to client 7. Client 7 comprises a general purpose computer with a processor (not shown) arranged to execute program code, which comprises client-end control software 8, stored in local memory (typically semiconductor memory, not shown) to perform receipt and processing for display at display 9 (for example a high-resolution CRT or plasma display) of images received via network 6, for example the Internet or a private data network. Images for display at client 7 are processed at graphics card/drivers 11. Network 6 is typically based on TCP/IP (e.g. the Internet) but could, alternatively, be based on another suitable protocol such as UDP when provided with suitable support for flow control and retransmission.

As indicated, above, server 1 comprises graphics application program 2 for controlling the rendering of images. The images are rendered, for example, from data held in storage device 4 (e.g. hard disk drive or semiconductor memory) representing a 3D model. Rendering of the images is implemented by a rendering engine, represented by graphics card/drivers 3 in collaboration with graphics application program 2 under the control of application-end control software 5. Application-end control software 5 delivers the rendered images (with compression) to client 7 over network 6.

Figure 2:
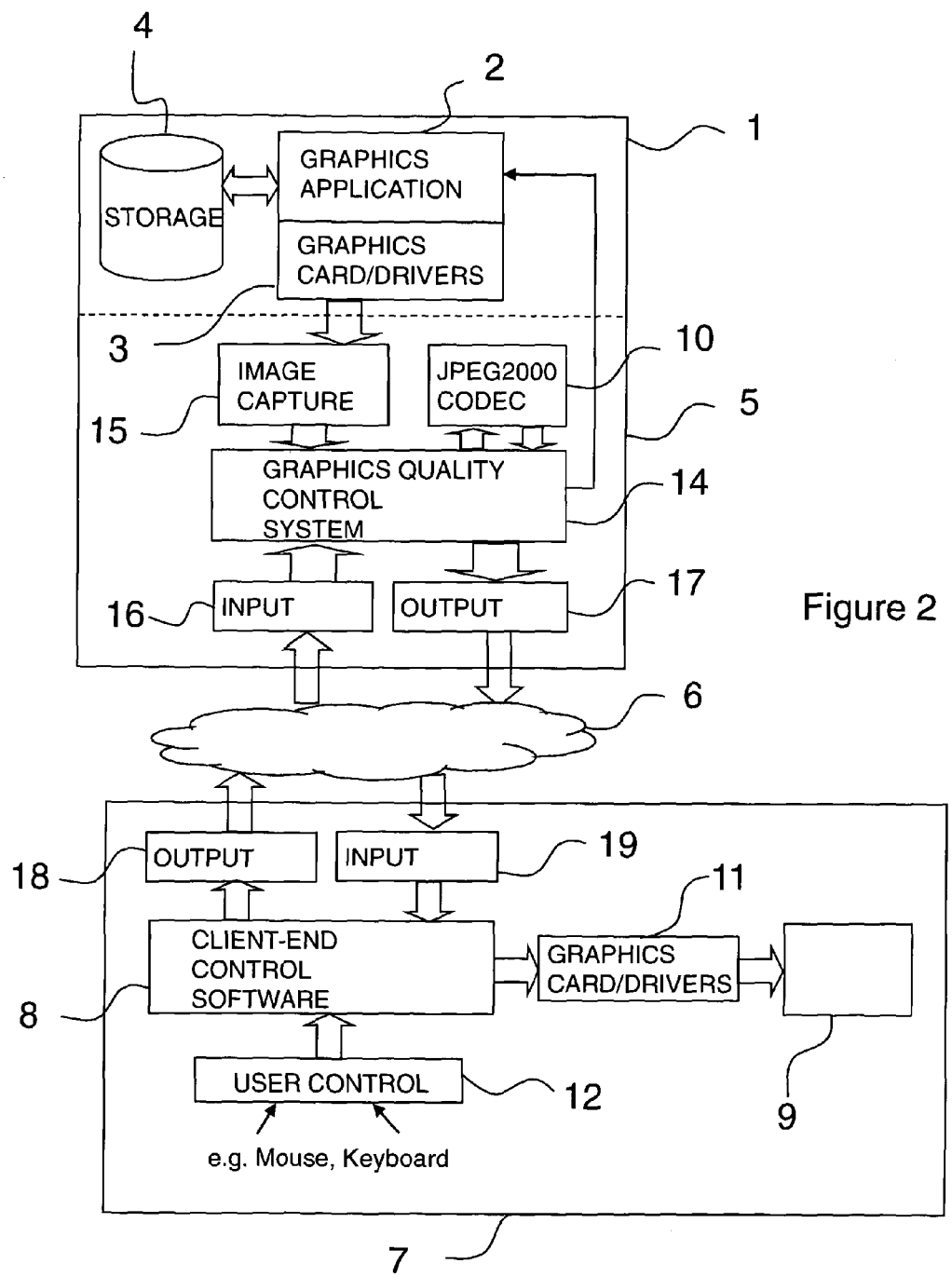
FIG. 2 is a block diagram showing, in further detail, functional components of the system of FIG. 1.

Referring to FIG. 2, functional components of the server 1 and client 7 are shown in greater detail. In server 1, components of the application-end control software 5 include image capture component 15, encoder 10, graphics quality control system 14 (hereafter referred to simply as the QCS) and input and output interfaces 16, 17. Image processing at server 1 employs compression to control the amount of data that needs to be transmitted over network 6. Encoder 10, e.g. a codec, may be implemented in hardware or software and represents any device or program capable of suitably encoding digital data for compression. JPEG2000 is a suitable codec compression algorithm for encoding captured images but, in principle, other compression codecs, such as standard JPEG, may be employed.

At client 7, client-end control software 8 transmits and receives data to/from network 6 via respective output and input interfaces 18, 19. Transmitted data may include user settings and/or user control signals 12, the latter resulting from, for example, mouse or keyboard inputs associated with a user manipulating the 3D model being represented on display 9. Data received by client-end control software 8 comprises compressed image data transmitted from application-end control software 5 representing updated images of the model for display on display 9 using graphics card/driver 11.

When the user interacts with the 3D model, for example to rotate the model to a different viewing angle using mouse or keyboard (not shown), the resultant control signals 12 are transmitted from client-end control software 8 to both the graphics application 2 (i.e. to identify how the model is to be translated and which new images need to be acquired from storage) and to the QCS 14. In response, graphics application 2 acquires the new data from storage 4, outputs the visualisation using graphics card 3 after which each image is captured and compressed by codec 10. According to a further aspect, only the resizing of a window is detected with other user interactions being determined by comparing the previous frame to the current frame. Each image is transmitted by QCS 14 to client-end control software 8.

Figure 6:
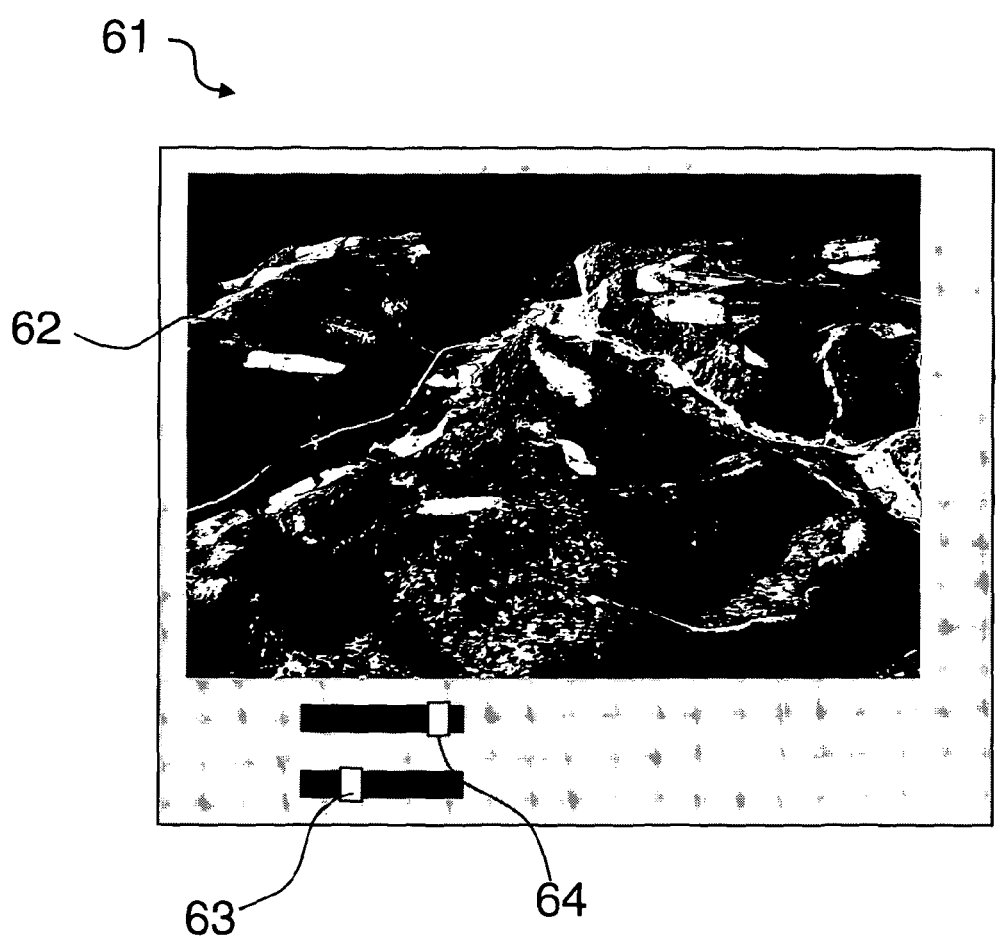
FIG. 6 is a representation of a client-end display for presentation of images processed according to certain example embodiments of the invention.

FIG. 6 is a representation of a GUI for presentation of images on client display 9. Initially, when a user runs client software 8 at user terminal 7, a connection will be established via Internet 6 with control software 5 running on server 1 and the client software will open on display 9, the GUI 61 indicated in FIG. 6. GUI 61 is shown in FIG. 6, by way of example, as displaying in a main image screen 62 an image rendered from modelling of typical geophysical data. In addition, there are provided first and second slider bars 63, 64 for adjustment by the user of settings, e.g. zoom and pan. Slider bars 63, 64 will initially have default values which are sent to QCS 14. Upon receipt of the default values, QCS 14 commences transmitting images of the model's current view with a compression and frame rate determined by said default settings. Given that the values can be updated dynamically by the user, these values are re-transmitted to QCS 14 whenever they are changed to ensure the resulting effect of any change can be seen at GUI 61 in real time, or at least something approaching real time.

Figure 3A:
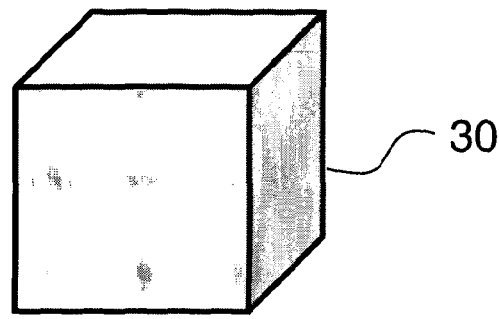
FIGS. 3a, 3b and 3c show a representation of a 3D model and 2D images.
Figure 3B:
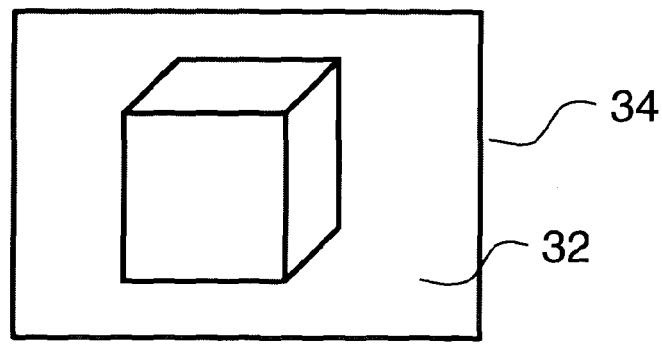
Figure 3C:
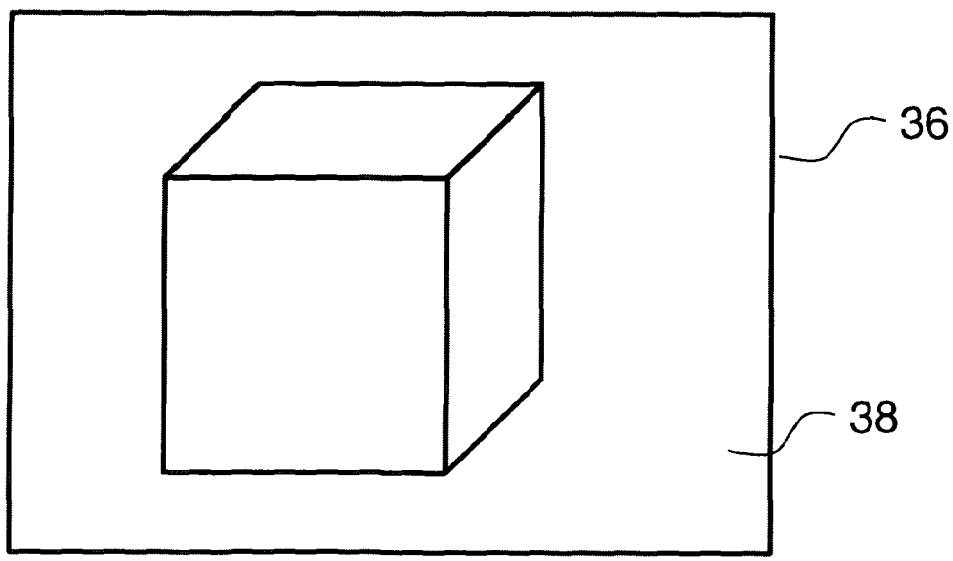

FIG. 3a shows a three dimensional model of a cube 30, i.e. as generated by software running on the processor (not shown) of server 1. Graphics application programme 2 running on server 1 operates to render images of the 3D model cube 30. For example, a first 2D image 32 is generated from 3D model 30, compressed and sent to client 7 for display. FIG. 3b shows 2D image 32 having been decompressed and displayed within window 34 on display 9. When a user at client 7 requests a larger view of cube 30 (e.g. by dragging a corner of window 34 to stretch it) a request is sent to server 1 in the normal way. In response to the request, server 1 renders a second image showing the same view of cube 30 but now with larger image 38 within larger window 36. The new image is sent from server 1 for display at client 7, as before. FIG. 3c shows 2D image 38 having been decompressed and displayed within window 36 on display 9.

Figure 4A:
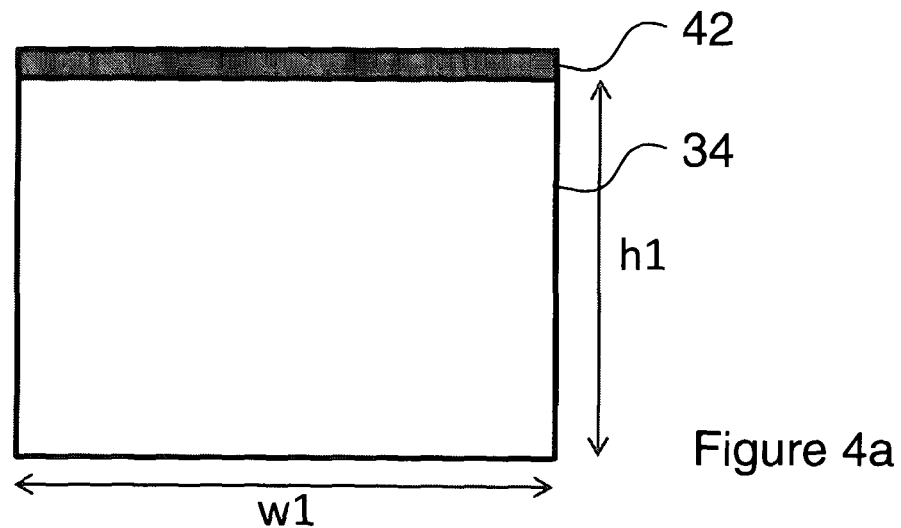
FIGS. 4a and 4b show example client windows for displaying an image.
Figure 4B:
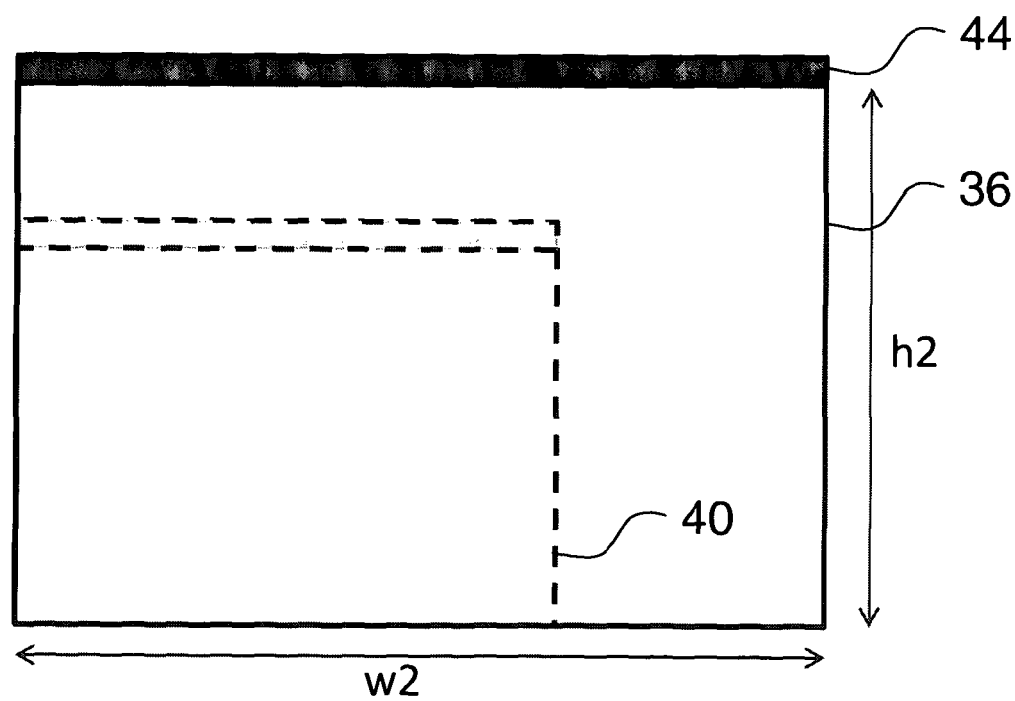

The invention in certain example embodiments works to calculate an appropriate compression value for each different image size in order to maintain a consistent image quality when the images are decompressed and displayed at client 7. The size of the image displayed at client 7 may be changed, for example, by merely dragging a corner or edge of window 34 or using controls provided as part of a graphical user interface (e.g. GUI 61 in FIG. 6). Alternatively, a new image can be requested, for example based on an instruction to the modelling software to vary the model. To further illustrate example aspects of the invention, FIG. 4a shows window 34 in a first size with image dimensions width w1 and height h1 (e.g. measured in picture elements or pixels). Here the image size is the size of window 34 less the size of window border 42. FIG. 4b shows resized window 36 after it has been manipulated by a user at client 7 to increase its size of the image to a width of w2 and a height of h2 pixels. Here the image size is the size of window 36 less the size of window border 44. Also in FIG. 4b is shown the previous window size 40 in broken lines for comparison purposes.

Calculation of the appropriate compression level for rendering an image at different sizes will now be described in detail. Given a previous image which has been compressed according to a previous compression value cv; the previous image size being w1*h1 (defined by image width w1 and image height h1) and a new image size of w2*h2 (defined by image width w2 and image height h2), an "area of change factor" aocf is determined as follows:

$$aocf=(w2*h2)/(w1*h1)=(\text{image area of new image})/(\text{image area of previous image}).$$

A "change factor" cf to be applied to determine the compression value for the new image size is determined as follows:

$$cf=\exp(\text{scaleFactor}*\log(aocf))$$

where "log" is the natural logarithm and "scaleFactor" is selected depending on the desired rate of change of the compression value with image size. A typical value for scaleFactor is 0.7, however, different values will be preferred for different compression schemes to provide the desired consistency of perceived image quality for that scheme.

A new compression value, cv', is then determined where:

$$cv'=cv*cf$$

A sequence of image size changes and appropriate calculated compression values are listed in FIG. 5. FIG. 5 shows a table of typical compression values cv for different window sizes at a scaling factor of 0.7. A series of image sizes is shown with each new image size resulting in a new compression value (e.g. as illustrated in FIGS. 3b and 3c). At the first step 51 of the series, we have an image size of 1920 by 1200 resulting in a compression value of 50. At the second step 52 of the series, we have an image size of 1000 by 800 and a resulting compression value of 23.84. At the third step 53 of the series, we have an image size of 1920 by 1200 and a resulting compression value of 50—hence returning to the image size of step 1 results in the calculated compression value being the same (within rounding error limits) as that previously used in step 1. At the fourth step 54 of the series, we have an image size of 2000 by 2000 and a resulting compression value of 73.57. At the fifth step 55 of the series, we have an image size of 1800 by 1500 and a resulting compression value of 55.87, while at the sixth step 56 of the series, we have, again, an image size of 1920 by 1200 (i.e. as in steps 1 and 3) and, again, the compression value calculated comes to 50, equal in the compression values calculated at steps 1 and 3.

It is important to note that there may be a restricted range of compression values (for example 0 to 100) which are acceptable in a particular graphical system, with compression values outside of the range not being used. It is quite possible that, using the above technique, some of the calculated compression values will, at the extremes, lie outside of the restricted range. Optionally, when this occurs the compression value applied to the image will be limited, optionally to one or other of the limits of the range (i.e. in the current example, to either 0 or 100) but the actual calculated compression value will be retained as an input parameter for calculating the compression value for the next image. This is done in order for the technique to be able to correctly calculate the appropriate compression value for the next image size. Rather than the limited value, it is the real, calculated compression value that is used to determine a new compression value on the next window resize. Similarly, it may be necessary to round (e.g. to an integer value) the actual compression value determined by the technique to provide a value suitable for controlling the compressor. Optionally, where rounding is required, an accurate record (e.g. floating point or double, precision) of the actual compression value is retained in order for the technique to preserve accuracy when it comes to determine a new compression value on the next window resize.

The embodiments described above are to be understood as illustrative examples of the invention. Further embodiments of the invention are envisaged and will be evident to the skilled reader. It is to be understood that any feature described in relation to any one embodiment may also be used in combination with one or more features of another of the embodiments, or any combination of the embodiments. Furthermore, equivalents and modifications not described above may also be employed without departing from the scope of the invention, which is defined in the accompanying claims.

Although described, above in the context of a client-server system, the invention has application to any environment in which images are compressed after generation and need to be decompressed before use. Examples of such alternative environments include peer-to-peer networks and compression of images for storage. The invention is not restricted to any particular class of image and will typically, although not exclusively, be applied to images, such as that shown in FIG. 6, which occupy an entire window.

As will be understood by those skilled in the art, the invention may be implemented in computer program software, any or all of which may be contained on various storage media so that the program can be loaded onto one or more computers or could be downloaded over a computer network using a suitable transmission medium. A computer program product used to implement the invention may be embodied on any suitable carrier, readable by a suitable computer input device, such computer program product comprising, for example, optically readable marks or magnetic media.

What is claimed is:

1. A method of image processing for use with an image processing system comprising a processor, the method comprising:

rendering, via a rendering engine operating under control of the processor of the image processing system, a first image with a first area and compressing, via an encoder operating under control of the processor of the image processing system, the first image using a first compression value, wherein compressing the first image using the first compression value produces a compressed version of the first image for decompression for display at a first visual quality level;

rendering, via the rendering engine, a second image with a second area; and calculating from the first compression value and using the processor a second compression value for compressing the second image and compressing via the encoder the second image using the second compression value, the second compression value being related to the first compression value by a function proportional to the logarithm of the ratio of the second image area to the first image area;

wherein compressing the second image using the second compression value produces a compressed version of the second image for decompression for display at a second visual quality level;

wherein the first visual quality level and the second visual quality level are substantially the same.

2. The method as claimed in claim 1, further comprising:
rendering a third image with a third area;
calculating from the second compression value a third compression value for compressing the third image and compressing the third image using the third compression value;
wherein compressing the third image using the third compression value produces a compressed version of the third image for decompression for display at a third visual quality level; and
wherein the first, second, and third visual quality levels are substantially the same.

3. The method as claimed in claim 1, further comprising rendering a series of images each with a respective image area; wherein the method further comprises:
for the second image and each subsequent image of the series, calculating from the compression value for the previous image in the series and the ratio of the area of the image to the area of the previous image in the series a compression value for compressing the respective image and using the respective calculated compression values to create a series of compressed images for decompression for display;
wherein compressing the series of images using the respective calculated compression values produces a corresponding series of compressed images for decompression for display with a substantially constant image quality level for images of different areas.

4. The method as claimed in claim 3, wherein for any two images of the series which are of the same area, the calculated compression values are substantially the same.

5. The method as claimed in claim 3, wherein the compression value for an image is related to the compression value for the previous image in the series by a function proportional to the logarithm of the ratio of the area of the image to the area of the previous image.

6. The method as claimed in claim 1, wherein:
the first image is one entire image and the second image is another entire image, and
the first compression value is one value and the second compression value is another value.

7. The method as claimed in claim 6, wherein the compressing operates on an entire image.

8. The method as claimed in claim 1, wherein the compressing operates on an entire image.

9. A non-transitory computer readable medium storing a computer program, or suite of computer programs arranged, when run on a processing system, to at least:
render a first image with a first area and compress the first image using a first compression value, wherein compressing the first image using the first compression value produces a compressed version of the first image for decompression for display at a first visual quality level;
render a second image with a second area; and
calculate from the first compression value a second compression value for compressing the second image and compress the second image using the second compression value, the second compression value being related to the first compression value by a function proportional to the logarithm of the ratio of the second image area to the first image area;
wherein compressing the second image using the second compression value produces a compressed version of the second image for decompression for display at a second visual quality level;
wherein the first visual quality level and the second visual quality level are substantially the same.

10. An image processing system comprising an image processor configured in use to at least provide:
(a) a rendering engine for rendering a series of images each with a respective image area;
(b) a compression value generator for calculating for each image of the series starting from the second image of the series from the ratio of the area of the image to the area of the previous image in the series and the compression value for the previous image in the series a compression value for compressing the respective image, wherein the compression value is related to the previous compression value by a function proportional to the logarithm of the ratio of the image area to the previous image area; and
(c) an encoder for compressing the series of images using the respective calculated compression values to produce a corresponding series of compressed images for decompression for display with a substantially constant image quality level.

* * * * *